(12) United States Patent
Doersam et al.

(10) Patent No.: US 10,800,286 B2
(45) Date of Patent: Oct. 13, 2020

(54) ENERGY STORAGE DEVICE FOR A MOTOR VEHICLE

(71) Applicant: Daimler AG, Stuttgart (DE)

(72) Inventors: Thomas Doersam, Stuttgart (DE); Andreas Eichinger, Ammerbuch (DE); Rainer Falsett, Babenhausen (DE); Heiko Hachtel, Schwieberdingen (DE); Frieder Herb, Kirchheim (DE); Oliver Lehmann, Leonberg (DE); Christian Ohms, Ehningen (DE)

(73) Assignee: Daimler AG, Stuttgart (DE)

( * ) Notice: Subject to any disclaimer, the term of this patent is extended or adjusted under 35 U.S.C. 154(b) by 128 days.

(21) Appl. No.: 16/314,068

(22) PCT Filed: Jun. 9, 2017

(86) PCT No.: PCT/EP2017/000676
§ 371 (c)(1),
(2) Date: Dec. 28, 2018

(87) PCT Pub. No.: WO2018/001544
PCT Pub. Date: Jan. 4, 2018

(65) Prior Publication Data
US 2020/0180470 A1 Jun. 11, 2020

(30) Foreign Application Priority Data

Jul. 1, 2016 (DE) .................. 10 2016 008 052

(51) Int. Cl.
*B60L 58/19* (2019.01)
*B60L 58/20* (2019.01)
*H02J 7/00* (2006.01)

(52) U.S. Cl.
CPC ............ *B60L 58/19* (2019.02); *B60L 58/20* (2019.02); *H02J 7/0024* (2013.01); *H02J 2310/48* (2020.01)

(58) Field of Classification Search
CPC ........ B60L 58/19; B60L 58/20; H02J 7/0024; H02J 2310/48; Y02T 10/7005; Y02T 10/705; H01M 2220/20
(Continued)

(56) References Cited

U.S. PATENT DOCUMENTS

| 10,186,861 B2 * | 1/2019 | Rapp ..................... H02J 1/00 |
| 2011/0109164 A1 * | 5/2011 | Mohammed Suhura ..................... H05B 35/00 307/66 |

(Continued)

FOREIGN PATENT DOCUMENTS

| DE | 10 2014 004 790 A1 | 10/2015 |
| DE | 10 2015 006 208 A1 | 12/2015 |

(Continued)

OTHER PUBLICATIONS

German-language European Office Action issued in European counterpart application No. 17 729 356.0-1202 dated Jul. 26, 2019 (Four (4) pages).

(Continued)

*Primary Examiner* — M Baye Diao
(74) *Attorney, Agent, or Firm* — Crowell & Moring LLP

(57) ABSTRACT

An energy storage device for a motor vehicle includes a first energy store and a second energy store for storing electrical energy, a charging connection for charging the energy stores, an operating connection for operating a load on the energy storage device, and a switching device which has a plurality of switching elements and via which the energy stores can be connected selectively in series or in parallel. A fifth (Continued)

switching element of the switching device is permanently electrically coupled to the electrical poles of opposite polarity of the energy stores and the energy stores can be connected in series via the fifth switching element independently of the other switching elements of the switching device.

6 Claims, 1 Drawing Sheet

(58) Field of Classification Search
USPC .......................................................... 320/104
See application file for complete search history.

(56) References Cited

U.S. PATENT DOCUMENTS

| | | | |
|---|---|---|---|
| 2012/0256568 A1* | 10/2012 | Lee | H02J 7/1423 318/139 |
| 2015/0222132 A1* | 8/2015 | Shikatani | H01M 10/441 320/117 |

FOREIGN PATENT DOCUMENTS

| EP | 2 897 247 A1 | 7/2015 |
|---|---|---|
| EP | 3 358 701 A2 | 8/2018 |

OTHER PUBLICATIONS

PCT/EP2017/000676, International Search Report dated Aug. 21, 2017 (Two (2) pages).

* cited by examiner

ENERGY STORAGE DEVICE FOR A MOTOR VEHICLE

BACKGROUND AND SUMMARY OF THE INVENTION

The invention relates to an energy storage device for a motor vehicle.

An energy storage device or a battery assembly, which is operated at a higher voltage than the conventional 12 or 24 volts, is often employed in modern motor vehicles. In motor vehicles which, in particular, also have an electric drive motor, voltages of multiple 100 volts may be provided as nominal voltage or operating voltage. Such energy storage devices are typically charged by a motor vehicle-external charging device, which is part of a charging infrastructure. If a motor vehicle is designed for a higher voltage or includes an energy storage device having a higher nominal voltage than is provided by the charging infrastructure, the energy storage device or the battery assembly cannot be easily charged by the charging infrastructure. This problem is normally solved by a power electronic circuit, which is large, expensive and heavy.

In this context, DE 10 2015 006 208 A1 discloses a theoretical concept, by means of which a charging configuration for a battery assembly at a charging connection enables the nominal voltage of the battery assembly to be doubled or halved.

The object is to provide a battery assembly or an energy storage device in a motor vehicle, with which the problem described may be solved in an efficient manner and, in particular, with which pertinent safety requirements for the operation of an energy storage device in a motor vehicle are met.

The invention relates to an energy storage device or battery assembly for a motor vehicle. The energy storage device includes a first energy store and a second energy store for storing electrical energy. It may also include more than two energy stores. The energy stores may comprise batteries or capacitors, for example. The energy stores in this case may have a shared housing. The energy stores or battery elements in this case may provide an equal voltage and/or an equal maximum quantity of energy or energy capacity. The energy storage device may thus be referred to as a switchable and/or separable energy storage device. The energy storage device also includes two connections, a charging connection for charging the energy storage device via a motor vehicle-external charging infrastructure, as well as an operating connection for connecting and operating a motor vehicle-internal consumer or generator on the energy storage device. The energy storage device further includes a switching device, which has multiple, i.e., for example, three, five or seven switching elements, and by means of which the energy stores may connected selectively in series or in parallel. The switching elements may be simple switches, by means of which an electric line between the two connections may be established or disconnected. This may be implemented, for example, by a complete disconnection or by a complete coupling (digital "0-1 principle").

Significant here is the fact that a switching element, referred to hereinafter as a fifth switching element, of the switching device is permanently electrically coupled to the electrical poles of opposite polarity of the energy stores. The fifth switching element therefore serves to electrically couple the positive pole and the negative pole or the negative pole and the positive pole of the two energy stores and to connect them in series. With the fifth switching element, the energy stores may be connected in series independently of the further switching elements of the switching device or of a switching state of the further switching elements of the switching device.

This has the advantage that the two energy stores may be connected in series or in parallel with minimal effort. Moreover, the switching device may be implemented in a housing with the energy storage device, so that the control of the switching elements is implemented compactly in the motor vehicle. Since the fifth switching element has no further functions, in particular, is not used for a regulation disconnection of all poles of the energy storage device or of the energy stores, it may also be implemented as a semiconductor switching element, for example, as a diode or transistor, without meeting corresponding pertinent safety requirements for high voltage batteries, which prescribe a voltage cut-off of all poles of energy stores in a motor vehicle. A high voltage battery in this case may be understood to mean a battery with more than 60 volts of nominal voltage.

Thus, the fifth switching element enables the energy storage device, via the switching device, to be brought into four different operating states and a charging at an infrastructure may be implemented with lower voltage. The four possible operating states in this case relate to a first operating state for driving with a normal battery voltage, which corresponds to the energy storage devices connected in series, to a second operating state for a charging with half the battery voltage, i.e., a battery voltage which in the case of energy stores of equal voltage corresponds to one of the two energy stores and thus, to the energy stores connected in parallel, to a third operating state for a charging with the normal battery voltage, and to a fourth operating state with voltage cut-off of all poles and disconnection of the energy stores from the charging connection and/or operating connection.

In one advantageous embodiment, it is provided that the positive pole of the second energy store may be electrically decoupled from the operating connection and, in particular, also from the charging connection by means of a first switching element coupled to the positive pole of the second energy store.

In another advantageous embodiment, it is provided that the negative pole of the first energy store may be electrically decoupled from the operating connection and, in particular, also from the charging connection by means of a second switching element coupled to the negative pole of the first energy store.

In one particularly advantageous embodiment, it is provided that a positive pole of the charging connection may be electrically decoupled from the positive poles of the energy store by means of a third switching element and a negative pole of the charging connection may be decoupled from the negative poles of the energy store by means of a fourth switching element, wherein third and/or fourth switching element is/are designed, in particular, as a battery contactor and/or charging contactor. This has the advantage that the battery contactor and the charging contactor are utilized not only for their conventional function, but are included in the circuits required for the different operating states, which keeps the number of components to a minimum. Moreover, no additional charge contactors are thus required for direct current charging via the charging connection.

In a next embodiment, it is provided that the positive pole of the first energy store may be electrically decoupled from the operating connection and from the charging connection by means of a sixth switching element coupled to the positive pole of the first energy store.

In another preferred embodiment, it is provided that the negative pole of the second energy store may be electrically decoupled from the operating connection and also from the charging connection by means of a seventh switching element coupled to the negative pole of the second energy store.

For better readability, the pole of a first polarity has been referred to as negative pole and the pole of a second electrical polarity of an energy store as positive pole within the scope of this invention. Since this is a mere convention, the negative pole may also refer to poles of an electrical polarity within the scope of this disclosure, which are referred to in other documents as positive poles. What matters is that the negative pole within the scope of this invention relates to a first pole and the positive pole relates to a second pole with opposite polarity.

The features and feature combinations cited in the description above, as well as the features and feature combinations cited below in the figure description and/or shown alone in the figures may be used not only in the respectively indicated combinations, but in other combinations as well, without departing from the scope of the invention. Thus, embodiments of the invention are to be considered included and disclosed that are not explicitly shown and explained in the figures, but that arise and may be produced from the embodiments explained by separated feature combinations. Embodiments and feature combinations are also to be considered disclosed, which therefore do not include all features of an originally worded independent claim. Embodiments and feature combinations are also to be considered disclosed, in particular, by the embodiments presented above, which go beyond the feature combinations presented in the dependencies of the claims or which differ from these.

Exemplary embodiments of the invention are explained in greater detail below with reference to schematic drawings.

DETAILED DESCRIPTION OF THE DRAWINGS

Figure 1:
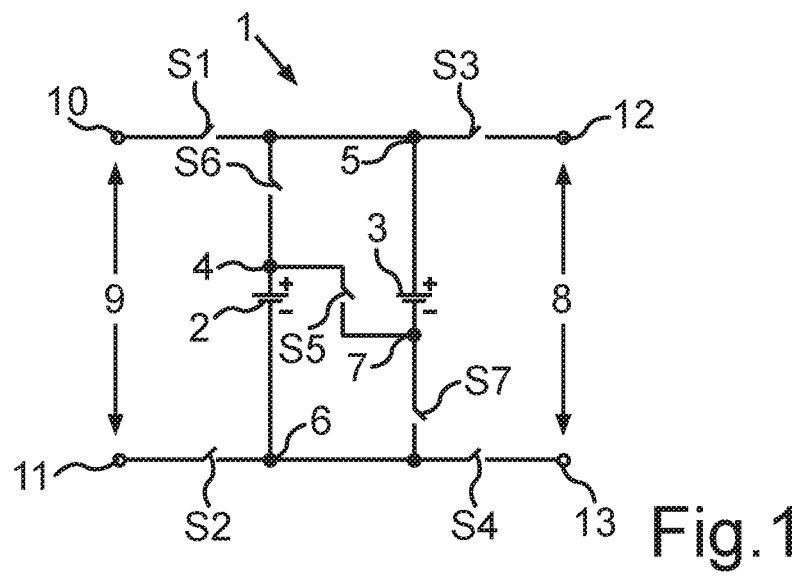
FIG. 1 shows a circuit diagram of a first exemplary embodiment of an energy storage device.

Identical or functionally identical elements are provided with identical reference numerals in the figures.

FIG. 1 shows the circuit diagram of an energy storage device 1 for a motor vehicle, comprising a first energy store 2 and a second energy store 3, with a first positive pole 4 of the first energy store and a second positive pole 5 of the second energy store 3, as well as a first negative pole 6 of the first energy store 2 and a second negative pole 7 of the second energy store 5. In addition, the energy storage device 1 also includes a charging connection 8 for charging the energy stores 2, 3, as well as an operating connection 9 for supplying one or multiple consumers via the energy storage device 1. Moreover, the energy storage device 1 here comprises a switching device, which includes multiple, seven switching elements S1 through S7 in the example shown. The energy stores 2, 3 may be selectively connected in series or in parallel by means of these switching elements S1 through S7. The switching elements in the example shown are simple switches, which are able to either switch on or switch off an electrical connection according to the digital principal.

In the example shown, the fifth switching element S5 is permanently coupled to the first positive pole 4 and to the second negative pole 7. Conversely, it could also be coupled to the first negative pole 6 and to the second positive pole 5, then an equivalent effect of the switching device or the energy storage device would be achieved by having to also interchange the positive poles and negative poles, respectively, for the circuits cited below. For reasons of better readability, this will be dispensed with here, what matters is that the fifth switching element S5 is coupled to electrical poles of opposite polarity of the two energy stores 2, 3 and the energy stores 2, 3 may be connected in series to the fifth switching element S5 independently of the further switching elements S1 through S4 and S6, S7 or to a state of the same. This takes place, of course, so that short circuits are avoided. This may be implemented or accounted for in the control electronics of the switching device, for example.

Thus, a series connection of the two energy stores 2, 3 or battery elements is enabled by means of the fifth switching element S5. Since the switching element S5 is not responsible for the activation, and therefore not for a disconnection of all poles or decoupling of the energy stores 2, 3 from charging connection and/or operating connection 8, 9, the fifth switching element S5 may also be designed as a semiconductor component, without violating pertinent requirements regarding safety in high-voltage batteries.

In the example shown, the first switching element S1 is electrically disposed between the positive poles 4, 5 of the energy stores 2, 3 and the positive pole 10 of the operating connection. The second switching element S2 is electrically disposed here between the negative poles 6, 7 of the energy stores 2, 3 and the negative pole 11 of the operating connection 9. The two switching elements S1, S2 may thus be utilized in order to disconnect the operating connection 9 completely, i.e., from all poles of the energy stores 2, 3.

The third switching element S3 in the present case is disposed between the electrical positive poles 4, 5 of the energy stores 2, 3 and the positive pole 12 of the charging connection 8. The fourth switching element S4 is correspondingly disposed between the negative poles 6, 7 of the energy stores 2, 3 and a negative pole 13 of the charging connection 8. The two switching elements S3, S4 may thus be utilized in order to decouple the charging connection 8 from the energy stores 2, 3 and to thus deactivate these at all poles. The third and the fourth switching elements S3, S4 may function simultaneously as charging contactors.

In the present case, the sixth switching element S6 is electrically disposed between the first electrical positive pole 4 on the one hand and the first switching element S1 and the second positive pole 5 on the other hand. Similarly, the seventh switching element S7 is disposed between the second electrical negative pole 7 on the one hand and the first electrical negative pole 6 and the fourth switching element S4 on the other hand. A parallel connection of the two energy stores 2, 3, each of which may be battery elements, for example, is thus enabled by means of the sixth and of the seventh switching elements S6, S7. Since the two switching elements S6 and S7 are not responsible for the activation, i.e., for the coupling of the energy stores 2, 3 to charging connection or operating connection 8, 9, and, accordingly, need not satisfy the pertinent safety requirements for a disconnection of all poles, they may also be designed, for example, as a semiconductor element, for example, as a transistor or as a diode.

A first operating state, for example, a normal driving mode, in which the energy stores 2, 3 are connected in series, may now be achieved by the switching elements S1, S2 and S5 being closed, but the switching elements S3, S4, S6 and S7 being open. A second operating state, for example, for charging with half the battery voltage, in which the energy stores 2, 3 are connected in parallel, and in which the operating connection is connected, i.e., electrically coupled to the energy stores 2, 3, may be achieved here by the switching elements S1 through S4 being closed, the switching element S5 being open and the switching elements S6 and S7, in turn, being closed. An alternative second operating state, which also enables a charging with half the battery voltage, but with the operating connection being disconnected, may be achieved here by the switches S1 and S2 being open, the switching elements S3 and S4 being closed, the switching element S5 being open and the switching elements S6 and S7 being closed. A third operating state, for example, for a charging with full battery voltage, in which in the present case the operating connection is connected and the energy stores 2, 3 are connected in series, may be achieved by the switching elements S1 through S5 being closed, but the switching elements S6 and S7 being open. Alternatively, the third operating state, for example, for charging with full battery voltage, may be set at a disconnected operating connection by the switching elements S1 and S2 being open, the switching elements S3 through S5 being closed and the switching elements S6 and S7 being open. A fourth operating state, for example, for disconnecting all poles, may be achieved by the switching elements S1 through S4 being open. In this case, the connection state of the additional switching elements S5 through S7 are then not important.

Figure 2:
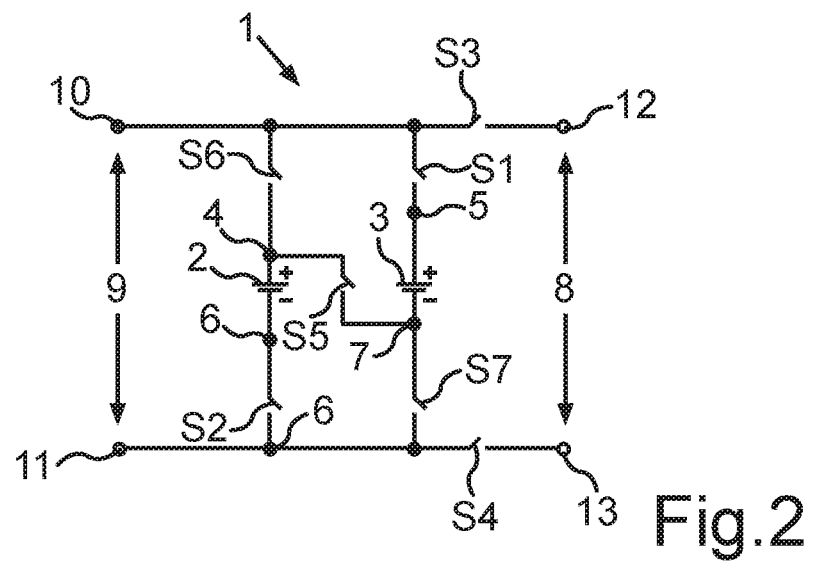
FIG. 2 shows a circuit diagram of a second exemplary embodiment of an energy storage device.

FIG. 2 shows the circuit diagram of an energy storage device 1 for a motor vehicle comprising a first energy store 2 and a second energy store 3 with a first positive pole 4 of the first energy store 2 and a second positive pole 5 of the second energy store 3, as well as a first negative pole 6 of the first energy store 2 and a second negative pole 7 of the second energy store 5. In addition, the energy storage device 1 also includes a charging connection 8 for charging the energy stores 2, 3, as well as an operating connection 9 for supplying one or multiple consumers via the energy storage device 1. The energy storage device 1 here further comprises a switching device, which comprises multiple, in the example shown, seven switching elements S1 through S7. The energy stores 2, 3 may be selectively connected in series or in parallel by means of these switching elements S1 through S7. The switching elements in the example shown are simple switches, which are able to either switch on or switch off an electrical connection according to the digital principle.

In the example shown, the fifth switching element S5 is then permanently coupled to the first positive pole 4 and to the second negative pole 7. Conversely, it could also be electrically coupled to the first negative pole 6 and to the second positive pole 5, then an equivalent effect of the switching device or of the energy storage device would be achieved by having to also interchange the positive poles and negative poles, respectively, for the circuits cited below. For reasons of better readability, this will be dispensed with here, what matters is that the fifth switching element S5 is coupled to electrical poles of opposite polarity of the two energy stores 2, 3 and the energy stores 2, 3 may be connected in series to the fifth switching element S5 independently of the additional switching elements S1 through S4 and S6, S7 or to a state of the same. This takes place, of course, so that short circuits are avoided. This may be implemented or accounted for in the control electronics of the switching device, for example.

In the example shown, the first switching element S1 is then disposed between the second positive pole 5 on the one hand, and the positive pole of the operating connection 9, the third switching element S3 and the sixth switching element S6 on the other hand. Similarly, the second switching element S2 is disposed or electrically interconnected between the first negative pole 6 on the one hand, and the negative pole 11 of the operating connection 9, as well as the fourth switching element S4, respectively, the negative pole 13 of the charging connection 8, as well as the seventh switching element S7, respectively, the second negative pole 7 on the other hand.

The third switching element S3 is disposed here between the positive pole 12 of the charging connection 8, as well as the remaining components, in particular, the first and the sixth switching elements S1, S6, as well as the positive poles 4, 5 of the energy stores 2, 3 and the positive pole 10 of the operating connection. The fourth switching element S4 is correspondingly disposed between the negative pole 13 of the charging connection 8 and the remaining components of the energy storage device 1, in particular, the second switching element S2 and the seventh switching element S7, respectively the first negative pole 6 and to the second negative pole 7, as well as the negative pole 11 of the operating connection. The disconnection of all poles of the charging connection 8 may be achieved by means of the switching elements S3, S4. The switching elements S3, S4 may optionally also function as charging contactors.

The sixth switching element S6 in this case is disposed between the first positive pole 4 on the one hand as well as the positive pole 10 of the operating connection 9 and the switching elements S1 and S3, respectively between the second positive pole 5 and the positive pole 12 of the charging connection 8 on the other hand. Correspondingly, the switching element S7 is electrically disposed between the second negative pole 7 on the one hand and the negative pole 7 of the operating connection 9 on the one hand, as well as the switching elements S2 and S4, respectively, first electrical negative pole 6 and the electrical negative pole 13 of the charging connection 8 on the other hand. A disconnection of all poles may thus be achieved by means of the switching elements S1, S2, S6 and S7, in particular, from the operating connection 9. At the same time, a parallel connection of the two energy stores 2, 3 may be implemented by the switching elements S1, S2, S6 and S7.

The first operating state, for example, a normal driving mode with energy stores 2, 3 connected in series may be implemented here by the switching elements S1, S2 and S5 being closed and by the switching elements S3, S4, S6 and S7 being open. The second state, for example, for charging with half the battery voltage, with energy stores 2, 3 connected in parallel, may be achieved here by the switching elements S1 through S4 being closed, the switching element S5 being open and the switching elements S6 and S7 being closed. The third operating state, for example, for charging with full battery voltage, with energy stores 2, 3 connected in series, may be achieved by the switching elements S1 through S5 being closed, but the switching elements S6 and S7 being open. The fourth state, for example, for disconnecting all poles, may be achieved by the switching elements S1, S2, S6 and S7 being open. The connection state of the switching elements S3, S4 and S5 is not important in this case.

Figure 3:
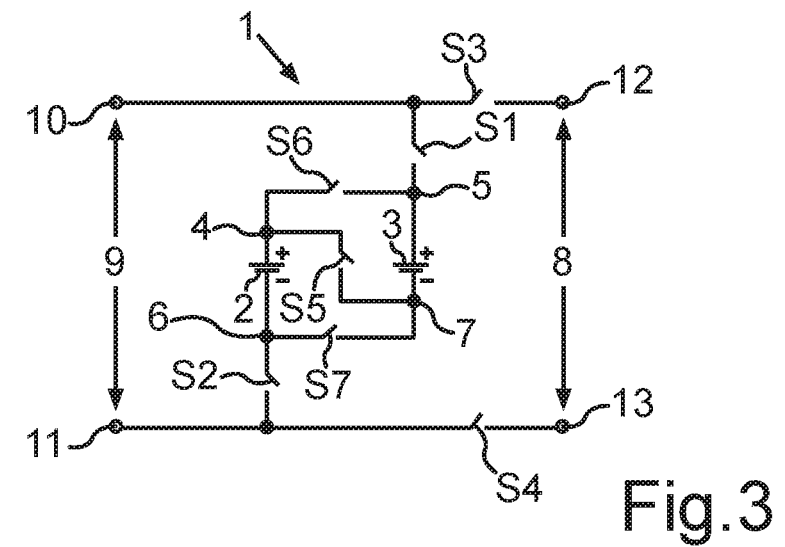
FIG. 3 shows a circuit diagram of a third exemplary embodiment of an energy storage device.

FIG. 3 shows the circuit diagram of an energy storage device 1 for a motor vehicle comprising a first energy store 2 and a second energy store 3, with a first positive pole 4 of the first energy store 2 and a second positive pole of the second energy store 3, as well as a first negative pole 6 of the first energy store 2 and a second negative pole 7 of the second energy store 5. In addition, the energy storage device 1 also includes a charging connection 8 for charging the energy stores 2, 3, as well as an operating connection 9 for supplying one or multiple consumers via the energy storage device 1. The energy storage device 1 here further includes a switching device, which comprises multiple, in the example shown, seven switching elements S1 through S7. The energy stores 2, 3 may be selectively connected in series and in parallel by means of these switching elements S1 through S7. The switching elements in the example shown are simple switches, which are able to either switch on or switch off an electrical connection according to the digital principle.

In the example shown, the fifth switching element S5 is then permanently coupled to the first positive pole 4 and to the second negative pole 7. Conversely, it could also be electrically coupled to the first negative pole 6 and to the second positive pole 5, then an equivalent effect of the switching device or of the energy storage device would be achieved by having to also interchange the positive poles and negative poles, respectively, for the circuits cited below. For reasons of better readability, this will be dispensed with here, what matters is that the fifth switching element S5 is coupled to electrical poles of opposite polarity of the two energy stores 2, 3 and the energy stores 2, 3 may be connected in series to the fifth switching element S5 independently of the additional switching elements S1 through S4 and S6, S7 or to a state of the same. This takes place, of course, so that short circuits are avoided. This may be implemented or accounted for in the control electronics of the switching device, for example.

The third switching element S3 in the present case is disposed between the positive pole 12 of the charging connection 8 on the one hand and the first switching element S1 and the positive pole 10 of the operating connection 9. The fourth switching element S4 is correspondingly disposed between the negative pole 13 of the charging connection 8 on the one hand and the negative pole 11 of the operating connection 9 and the second switching element S2. The two switching elements S3, S4 may thus be utilized in order to decouple the charging connection 8 from the energy stores 2, 3, and thus to disconnect all poles of the latter. The third and the fourth switching elements S3, S4 may thus function as charging contactors.

The first switching element S1 in the present case is disposed between the second positive pole 5 on the one hand and the positive pole 10 of the operating connection 9, as well as the third switching element S3, respectively, the positive pole 12 of the charging connection 8 on the other hand. Correspondingly, the second switching element S2 is electrically disposed between the first negative pole 6 on the one hand and the negative pole 11 of the operating connection 9, as well as the fourth switching element S4, respectively, the negative pole 13 of the charging connection 8 on the other hand. Accordingly, the two switching elements S1 and S2 ensure the disconnection of all poles of the energy stores 2, 3 with respect to or from the operating connection 9. The aforementioned disconnection of all poles may also be implemented with respect to the charging connection 8 by means of the switching elements S1 and S2.

Situated between the first positive pole 4 and the second positive pole 5 in the present case is the sixth switching element S6. Correspondingly, the seventh switching element S7 is electrically disposed between the first negative pole 6 and the second negative pole 7. Thus, a parallel connection of the energy stores 2, 3 may be connected by means of the switching elements S6 and S7. Since the switching elements S6 and S7 in this case are not responsible for or required to be utilized for the activation or for the disconnection of all poles of the energy stores 2, 3, a design as a semiconductor element is also possible. Transistors or diodes may be used here, for example.

The first operating state, for example, the normal driving mode, with energy stores 2, 3 connected in series, may be achieved here for example by the switching elements S1, S2 and S5 being closed, and the switching elements S3, S4 as well as S6 and S7 remaining open. The second operating state, for example for a charging with half the battery voltage, with energy stores 2, 3 connected in parallel, may be achieved here by the switching elements S1 through S4 being closed, the switching element S5 being open and the switching elements S6 and S7 being closed. The third state, for example, for charging with full battery voltage, with energy stores 2, 3 connected in series, may be achieved by the switching elements S1 through S5 being closed, but the switching elements S6 and S7 remaining open. The fourth state, for example, the disconnection of all poles, may be achieved here by the switching elements S1 and S2 being open and the remaining switching elements S3 through S7 having an arbitrary state between open and closed.

Thus, in all of the aforementioned exemplary embodiments, a flexible wiring concept is elegantly integrated using the switching elements already present in part due to pertinent safety requirements for high-voltage batteries with voltages above 60 volts, which allows for four different operating states, and thus enables with little effort and minimal space requirement a charging of the corresponding energy stores 2, 3 at a charging infrastructure with a charging voltage lower than the operating voltages provided by the energy storage device 1, as compared to the driving mode.

LIST OF REFERENCE CHARACTERS 1 energy storage device
2 first energy store
3 second energy store
4 first positive pole
5 second positive pole
6 first negative pole
7 second negative pole
8 charging connection
9 operating connection
10 positive pole
11 negative pole
12 positive pole
13 negative pole
S1-S7 first through seventh switching element

The invention claimed is:

1. An energy storage device for a motor vehicle, comprising:
a first energy store and a second energy store for storing electrical energy;
a charging connection for charging the first energy store and the second energy store;
an operating connection for operating a consumer on the energy storage device; and a switching device, wherein the switching device includes
a first switching element, a second switching element,
a third switching element, a fourth switching element,
a fifth switching element, a sixth switching element,
and a seventh switching element and wherein the first
energy store and the second energy store are selectively
connectable in series or in parallel by the switching
elements of the switching device;

wherein the fifth switching element is permanently electrically coupled to electrical poles of opposite polarity of the first energy store and the second energy store and wherein the first energy store and the second energy store are connectable in series by the fifth switching element independently of the other switching elements of the switching device;

wherein a positive pole of the charging connection is electrically decoupleable from the respective positive poles of the first energy store and the second energy store by the third switching element;

wherein a negative pole of the charging connection is electrically decoupleable from the respective negative poles of the first energy store and the second energy store by the fourth switching element;

wherein the third switching element is a battery contactor or a charging contactor and/or the fourth switching element is a battery contactor or a charging contactor.

2. The energy storage device according to claim 1, wherein the positive pole of the second energy store is electrically decoupleable from the operating connection and from the charging connection by the first switching element coupled to the positive pole of the second energy store.

3. The energy storage device according to claim 1, wherein the negative pole of the first energy store is electrically decoupleable from the operating connection and from the charging connection by the second switching element coupled to the negative pole of the first energy store.

4. The energy storage device according to claim 1, wherein the positive pole of the first energy store is electrically decoupleable from the operating connection and from the charging connection by the sixth switching element coupled to the positive pole of the first energy store.

5. The energy storage device according to claim 1, wherein the negative pole of the second energy store is electrically decoupleable from the operating connection and from the charging connection by the seventh switching element coupled to the negative pole of the second energy store.

6. The energy storage device according to claim 1, wherein the fifth switching element is a semiconductor switching element.

* * * * *